United States Patent Office 2,818,426
Patented Dec. 31, 1957

---

2,818,426

SODIUM SALT OF TRIDECYL β-SULFO-PROPIONATE

Milton Kosmin, Dayton, Ohio, assignor to Monsanto Chemical Company, St. Louis, Mo., a corporation of Delaware No Drawing. Application March 7, 1956
Serial No. 569,980

1 Claim. (Cl. 260—481)

The present invention relates to cleaning compositions and more particularly provides dishwashing agents comprising hitherto unknown salts of tridecyl β-sulfopropionate.

The provision of a detergent for dishwashing purposes presents peculiar problems. This is because the type of soil present on dishes which have been used to prepare or serve food is different from that encountered in the laundering of clothes and in the washing of most soiled objects. The presence of greases, starches and proteinaceous materials on dinnerware and cooking utensils has an adverse effect on the detersive and foaming properties of many cleaning compositions. It is known (Sanders et al. "Soap and Sanitary Chemicals." 29, No. 6, 45–8, 93 (1953)) that foam is particularly susceptible to greases, the introduction of fats to a dishwater containing plentiful suds often resulting in instantaneous marked reduction of lather. However, greases are not the only offending agents in reducing detergency and foam. Starchy pastes, egg residues and acidic juices also have a marked deleterious effect upon many commonly employed soaps and detergents. In the past, the prior art has attempted to overcome foam-instability by incorporating with the detersive agents materials which were known to impart foam stability to the cleaning agents even in the presence of offending greases and other food residues. This expedient has not been of general utility in that the foam stabilizer had to be suited to the detergent, e. g., while certain dialkylolamides were effective in stabilizing alkyl sulfate and alkylbenzenesulfonate foams they were not effective as foam stabilizers for surface-active agents such as the sulfosuccinates or the alkylphenol polyglycol ethers. Accordingly, research in the synthetic detergent field has been directed towards the provision of a cleaning composition which could be used for dishwashing in the absence of extraneous foam stabilizing agents. A satisfactory dishwashing agent should produce the maximum amount of foam in both soft and hard water, it should have good cleaning properties, and the stability of its lather and its cleaning properties should not be affected by the soils which are peculiar to dishwashing waters. I have found that a very good combination of properties which recommend them for use in dishwashing compositions are possessed by salts of tridecyl β-sulfopropionate having the formula $$ROOC.CH_2.CH_2SO_3M$$

in which M is a cation selected from the class consisting of alkali metal and ammonium and R is a tridecyl radical derived from an alcohol obtained according to the "Oxo" process by the reaction of carbon monoxide with hydrogen and a hydrocarbon selected from the class consisting of triisobutylene and tetrapropylene.

For convenience the presently provided compounds will be referred to simply as tridecyl β-sulfopropionate salts, i. e., the sodium, potassium, lithium and ammonium tridecyl β-sulfopropionates. The present salts are readily prepared by contacting a suitable tridecyl acrylate with an alkali metal or ammonium bisulfite or by hydrolyzing an alkali metal or ammonium sudfopropionitrile and then condensing the hydrolyzed product with the tridecyl alcohol substantially according to the schemes:

(I) $ROOC.CH:CH_2 + MHSO_3 \longrightarrow ROOC.CH_2CH_2SO_3M$ or (II)

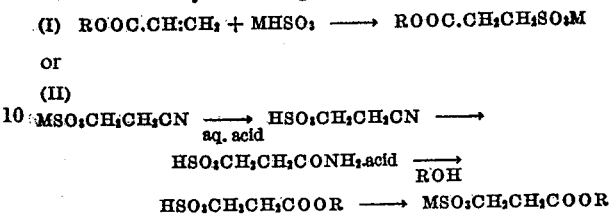

in which R and M are as defined above. Useful bisulfites are sodium, potassium, lithium and ammonium bisulfite. sulfopropionitriles which may be employed in reaction scheme (II) above are sodium, potassium, lithium and ammonium β-sulfopropionitriles. Hydrolysis of the alkali metal or ammonium β-sulfopropionitriles may be effected by employing any aqueous acidic medium, e. g., aqueous inorganic or organic acids such as sulfuric acid, hydrochloric acid, oxalic acid or acid-reacting organic or inorganic salts of the same. The alcohol used in the esterifying step is a mixture of tri-decanols obtained according to the "Oxo" process by the high pressure reaction of carbon monoxide and hydrogen with triisobutylene or tetrapropylene, n-tetradecanol, etc.

In preparing the present alkali metal or ammonium tridecyl β-sulfopropionates from the tridecyl acrylate and alkali metal or ammonium bisulfites, I operate substantially as follows: The acrylate is mixed with the bisulfite in aqueous solution and the resulting mixture is allowed to stand at ordinary or increased temperatures until addition of the bisulfite to the acrylate has occurred. When operating at increased temperatures, it is advantageous to employ in the reaction mixture an inhibitor of polymerization, e. g., hydroquinone, diphenylamine, 4-aminophenol, etc. An alcohol or other inert polar organic liquid may be used as a diluent. Isolation of the alkali metal tridecyl β-sulfopropionate may be effected by methods known to the art, e. g., by solvent extraction and/or precipitation from a known solvent. While addition of the bisulfite to the acrylate may be effected by working at ordinary temperatures, the reaction may be considerably accelerated by using temperatures of from around 50° C. to the refluxing temperature of the reaction mixture. The reaction may be conducted at atmospheric or superatmospheric pressures.

In preparing the alkali metal or ammonium tridecyl β-sulfopropionates from β-sulfopropionitrile I operate substantially as follows: The sulfopropionitrile is hydrolyzed by treating it with aqueous acid or acid salt at ordinary or increased temperature. To the hydrolyzed mixture there is then added the tridecyl alcohol to be employed for the esterification. The hydrolysis step is generally an exothermic reaction, depending upon the rate at which the hydrolyzing agent is added and the nature of the same. External cooling may be required. The esterification step may be effected at ordinary or increased temperatures; however, moderate heating is generally required to permit easy agitation of the often viscous or slurried reaction mixture and also to accelerate the reaction rate. Subsequent to the esterification step, the reaction mixture is neutralized with an alkali metal or ammonium hydroxide or a basically reacting salt thereof. The neutralized product comprises the alkali metal or ammonium salt of the tridecyl β-sulfopropionate and by-product inorganic salts. The latter precipitates from the reaction mixture upon cooling and standing or by treating it with dilute alcohol, and may be removed from the reaction mixture by filtering. The residue may then be freed from solvents by drying to give the alkali metal or ammonium tridecyl β-sulfopropionate.

The present invention is further illustrated, but not limited, by the following examples:

EXAMPLE 1

This example shows the preparation of sodium tridecyl β-sulfopropionate by reaction of sodium bisulfite with tridecyl acrylate (the ester of acrylic acid and a mixture of $C_{13}$ alcohols obtained by the "Oxo" process from tetrapropylene).

A mixture consisting of 130.5 g. (0.5 mole) tridecyl acrylate, 2.6 g. hydroquinone, 57.3 g. sodium bisulfite and 114.6 g. of water was heated, with stirring, at 90-95° C. for one hour and forty minutes. To the heated mixture there was then added 50 ml. of absolute ethanol and the whole was refluxed for 45 minutes. After allowing the reaction mixture to stand overnight at room temperature an additional 50 ml. portion of the absolute ethanol was added and refluxing was resumed and contained for one hour. During this time a small amount of polymeric material was observed to form on the walls of the reaction vessel. The liquid mixture was then poured off and filtered to remove any polymer. The clear filtrate was repeatedly washed with ethanol to remove inorganic salts. Concentration of the washed filtrate and subsequent drying for 65 hours in the vacuum oven at 48° C. gave 175.5 g. (96.3% theoretical yield) of the white, powdery, substantially pure sodium tridecyl β-sulfopropionate.

EXAMPLE 2

The lathering properties of the sodium tridecyl β-sulfopropionate of Example 1 as well as of some related compounds was tested by the Ross-Miles Lather Test of the American Society for Testing Materials. The following results were obtained:

| β-Sulfopropionate Tested | Ross-Miles Lather Heights, cm. | | | |
|---|---|---|---|---|
| | 50 p. p. m. | | 300 p. p. m. | |
| | At Once | After 5 Min. | At Once | After 5 Min. |
| Na tridecyl | 20.0 | 20.0 | 21.2 | 21.2 |
| Na lauryl | 17.1 | 17.2 | 4.3 | 4.3 |
| Na decyl | 1.6 | 0.0 | 3.8 | 0.0 |
| Na 2-ethylhexyl | 1.6 | 0.0 | 2.9 | 0.0 |
| Na hexadecyl | 5.5 | 5.5 | 1.4 | 0.9 |

The above data shows particularly marked differences of the alkyl β-sulfopropionates with respect to foaming abilities in soft and hard water. In water of 300 p. p. m. hardness the tridecyl ester gives 21 cm. of lather which is stable even after 5 minutes, whereas the lauryl ester gives only 4.3 cm. of lather. In either hard or soft water the lathering ability of the alkali metal sulfopropionates decreases with either decreasing or increasing carbon content of the alcohol portion of the molecule with the tridecyl ester being the most efficient. That the foaming properties of the sodium tridecyl β-sulfopropionate are particularly valuable for dishwashing purposes is shown in Example 3 which follows.

EXAMPLE 3

This example shows dishwashing tests conducted on a sodium tridecyl β-sulfopropionate prepared substantially according to the procedure of Example 1 as well as on the sodium salts of decyl, lauryl, tetradecyl, or hexadecyl β-sulfopropionate.

The procedure employed was substantially that used for the testing of dishwashing surfactants by the Chemical Specialties Manufacturers' Association and described in "Soap and Chemical Specialties," 31, No. 5, 54–57, 241–3 (1955). "Method B" as described therein was employed except for the modifications given below and the nature of the standard soil. In the present tests a standard soil was prepared from the following ingredients:

| | Percent |
|---|---|
| Swift's edible tallow | 25 |
| Mazola oil | 25 |
| Crisco | 24 |
| Oleic acid—Emery's Emersol 220 white Elaine | 1 |
| White wheat flour | 25 |
| Calcofluor White LD (Calco Division, American Cyanamid Co.) | 0.03 |

A 3000 g. batch of Standard Soil was prepared from said ingredients by first heating together the oils and the dye at 55° C., placing the heated mixture into a Kitchen Aid mixer bowl, and then mixing in the flour using the wire beater at speed No. 1. When all of the flour had been added, stirring was continued at the speed No. 2 position until the mix was cool and started to thicken.

Plain, white dinner plates (9" diameter) were soiled with the Standard Soil prepared as described above by evenly spreading the soil, which had been heated to 55° C., over the eating surface of the plates. Approximately 5 g. of the soil per plate was employed. The soiled plates were then stacked with spacers between them until the soil was set.

The procedure employed in washing the soiled plates was as follows:

Respective solutions of each of the test chemicals were prepared by dissolving 4.0 g. in one-liter of water of 300 p. p. m. hardness. The solutions were heated to 120° F. and placed in respective dishpans having the following dimensions: 12" across the top, 9" across the bottom and 5.5" deep. Three liters of water of the same temperature and hardness as that of said solutions were then added to the dishpans by pouring through a funnel, whereby initial foam was produced. The final concentration was 0.10% of the test chemical. The funnel had an outlet orifice diameter of about ½" and said outlet was 24" above the bottom of the dishpan. The initial foam height was measured to the nearest ½" above the surface of the solution and recorded.

Dishwashing time was determined by means of a stop watch. At zero time one of said soiled plates was placed with the soiled surface up in the dishpan. After 55 seconds a second similarly soiled plate was placed underneath the first one with a stainless steel 1" mesh screen placed between them. At 60 seconds from zero time the first plate was brushed with a weighted No. 50 utility brush having a total weight of 3.75 lbs. The brush had been soaked for 30 minutes in water before the test. The plate was brushed 5 times with a rotary motion in one direction and 5 times in the opposite direction. It was then inverted and the brushing operation was repeated on the back side. The entire brushing procedure was timed to be completed in from 22 to 25 seconds. The washed plate was then rinsed for about 5 seconds under cold running tap water and placed in the rack to dry. At one minute and 55 seconds from zero time a third similarly soiled plate was placed under the second one and the washing operation was repeated at the same rate with subsequent plates until only a thin layer of suds was visible over approximately ½ the area of the dishpan. This point is called the suds end point and the number of plates washed before the end point is reached determines the suds value of the test surfactant. The detergency end point is determined by observing the washed and dried plates, in the order in which they have been washed, first in ordinary light and then under an ultraviolet light. The number of plates which have been washed before slight unremoved soil spots are visible under ordinary light and heavy unremoved soil spots are visible under ultraviolet light is recorded as the detergency end point.

Employing the procedure described above the following results were obtained with the five compounds tested:

*Dishwashing Test Data*

[0.10% solids detergent conc. in 300 p. p. m. hard water.]

| Sample | Plates Washed to— | | Total Plates Washed | Suds Remaining |
|---|---|---|---|---|
| | Suds [1] End-Point | Detergency [1] End-Point | | |
| Na Decyl-β-sulfopropionate | 7 | 5 | 10 | 0. |
| Na Lauryl-β-sulfopropionate | 5 | 9 | 14 | Trace. |
| Na Tridecyl-β-sulfopropionate | 36 | 19 | 36 | ½ Area of Dishpan. |
| Na Tetradecyl-β-sulfopropionate | 1 | 5 | 12 | Trace. |
| Na Hexadecyl-β-sulfopropionate | 0 | 5 | 10 | Trace. |

[1] The higher these numbers the better the sample.

As is evident from the above data use of sodium tridecyl β-sulfopropionate in the dishwashing tests gave 36 clean plates before half of the surface area was suds-less, whereas the use of sodium lauryl β-sulfopropionate gave only 5 clean plates and the use of sodium tetradecyl β-sulfopropionate gave only 1 clean plate before all but a trace of suds (Suds-End Point) remained on the surface area of the dishwater. The Detergency End-Point (number of plates washed clean) measured by inspection of the washed plates under both ordinary and ultraviolet light showed that the use of the present sodium tridecyl β-sulfopropionate gave 19 clean plates, that the sodium lauryl β-sulfopropionate gave 9 clean plates and that sodium tetradecyl β-sulfopropionate gave only 5 clean plates. The test results show that the tridecyl β-sulfopropionate is more than twice as good with respect to both detersive properties and foam stability as its two nearest homologs.

This application is a continuation-in-part of my co-pending application, Serial No. 311,777, filed September 26, 1952, now abandoned.

What I claim is:

The sodium salt of tridecyl β-sulfopropionate in which the tridecyl radical is derived from an alcohol obtained by the reaction of carbon monoxide with hydrogen and a hydrocarbon selected from the class consisting of triisobutylene and tetrapropylene.

References Cited in the file of this patent

UNITED STATES PATENTS

| | | |
|---|---|---|
| 2,166,144 | Harris | July 8, 1939 |
| 2,624,766 | Butler | Jan. 6, 1953 |

U. S. DEPARTMENT OF COMMERCE
PATENT OFFICE

CERTIFICATE OF CORRECTION

Patent No. 2,818,426                      December 31, 1957

Milton Kosmin

It is hereby certified that error appears in the printed specification of the above numbered patent requiring correction and that the said Letters Patent should read as corrected below.

Column 3, line 22, for "contained" read -- continued --.

Signed and sealed this 4th day of March 1958.

(SEAL)
Attest:

KARL H. AXLINE                           ROBERT C. WATSON
Attesting Officer                       Commissioner of Patents